(12) United States Patent
Webb et al.

(10) Patent No.: US 10,969,349 B2
(45) Date of Patent: Apr. 6, 2021

(54) MARKERS TO IDENTIFY BINS AT SECURITY CHECKPOINTS

(71) Applicant: The Government of the United States of America, as represented by the Secretary of Homeland Security, Washington, DC (US)

(72) Inventors: Gary T. Webb, Washougal, WA (US); Robert Edward Gentry, Richardson, TX (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 249 days.

(21) Appl. No.: 15/953,653

(22) Filed: Apr. 16, 2018

(65) Prior Publication Data

US 2019/0317241 A1    Oct. 17, 2019

(51) Int. Cl.
| | | |
|---|---|---|
| *G01N 23/10* | (2018.01) | |
| *G01T 7/02* | (2006.01) | |
| *G01V 15/00* | (2006.01) | |
| *G01V 5/00* | (2006.01) | |

(52) U.S. Cl.
CPC ............... *G01N 23/10* (2013.01); *G01T 7/02* (2013.01); *G01V 15/00* (2013.01); *G01N 2223/409* (2013.01); *G01N 2223/639* (2013.01); *G01V 5/0016* (2013.01)

(58) Field of Classification Search
CPC ............... G01N 23/10; G01N 2223/00; G01N 2223/30; G01N 2223/409; G01N 2223/639; G01T 7/02; G01V 15/00; G09F 3/00; G09F 3/02; G09F 3/0208; G09F 3/0264; G09F 3/0272
See application file for complete search history.

(56) References Cited

U.S. PATENT DOCUMENTS

| | | | | |
|---|---|---|---|---|
| 2003/0062373 | A1* | 4/2003 | Holland | ................. G01N 23/02 220/660 |
| 2007/0132580 | A1* | 6/2007 | Ambrefe, Jr. | ............ B65D 1/34 340/541 |
| 2009/0196396 | A1* | 8/2009 | Doyle | ................. G01V 5/0008 378/53 |
| 2012/0114103 | A1* | 5/2012 | Aust | .................... G01V 5/0008 378/98.2 |
| 2014/0156561 | A1* | 6/2014 | Steele | ...................... B65D 1/36 705/500 |
| 2014/0226796 | A1* | 8/2014 | Eshetu | ...................... G09F 3/02 378/204 |

\* cited by examiner

*Primary Examiner* — Anastasia Midkiff
(74) *Attorney, Agent, or Firm* — Lavanya Ratnam; Kelly G. Hyndman (57) ABSTRACT

A bin for use in a security checkpoint can include a receptacle surface, sidewalls, a lip provided on the sidewalls, and a geometrical marker. The geometrical marker is radiographically, visually, and tactilely detectable on the lip of one side of the bin. The geometrical marker includes a plurality of tag elements.

9 Claims, 5 Drawing Sheets

MARKERS TO IDENTIFY BINS AT SECURITY CHECKPOINTS

BACKGROUND

Many security programs, including those performed at airport security checkpoints, conduct radiographic scans of objects. The objective in performing these scans is to determine the presence of forbidden items, such as firearms or other weapons. Often, radiographic scans rely on receptacles, such as divestiture bins, in which individuals place their belongings, such as bags or suitcases. Although the radiographic images provide an easy way to detect a possible forbidden item inside a particular receptacle, they do not reveal features about the exterior of the receptacle that would allow an individual viewing the physical receptacles to easily identify a particular receptacle and match it to its radiographic image. This can be particularly challenging when many similar objects, such as carry-on suitcases, are passed through a security point, and where there is a time displacement from when the radiographic images are produced to when security personnel can access the receptacles that pass through the radiographic scan. Thus, it is not possible to efficiently or reliably correlate a radiographic image of a receptacle/bin to the corresponding physical receptacle/bin.

BRIEF DESCRIPTION OF THE DRAWINGS

A more complete appreciation of an object of the present disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numbers designate identical or corresponding parts throughout the several views. Further, as used herein, the words "a", "an" and the like generally carry a meaning of "one or more", unless stated otherwise.

The present disclosure relates generally to the detection and seizure of forbidden items, such as weapons, at security checkpoints using radiographic scans. The lack of unique physical, visual, and/or radiographically unique features on containers holding a possible forbidden item often leads to significant delays at security checkpoints, or even a misidentification of the container holding the possible forbidden item. Misidentification can occur frequently when several similar holding containers, such as standard carry-on suitcases at an airport security checkpoint, are placed next to each other. Such a misidentification can lead to a seizure of the wrong container and make seizure of a possible forbidden item difficult.

Accordingly, one object of the present disclosure is to mark divestiture bins used at security checkpoints in such a way that the markings can be easily, quickly, and accurately identified in both the radiographic image and visual inspection of the physical bin. The marker can be detectable by radiographic screenings, as well as visual and tactile inspection, and is applied in a geometric pattern that is unique to each bin used at a given security checkpoint.

Due to the high volume of bins already in use at security checkpoints, the marker can be applied to unmarked bins already in use, and can be applied to a large number of bins while still ensuring that each bin is uniquely marked to allow for accurate identification.

Because of the routine wear and tear to bins, and the frequent turnover of worn-out bins, the marker can be applied in an economical and durable way. Accordingly, the cost of applying and replacing the marker in worn-out bins is significantly lower compared to the use of electronic technology, such as RFID chips. Furthermore, the marker can withstand wear and tear experienced by bins at security checkpoints significantly better than where a marker has been applied by adhesive. In the event that part of the marker (e.g., one or more tag elements) is removed through wear and tear, that part can be replaced in a way that maintains the unique geometric pattern of the marker and without the need to replace the entire bin.

The marker does not rely on any additional devices or technology, such as an RFID scanner. Thus, it has the advantage of avoiding computer-based interferences, such as hacking or signal jamming.

Another object of the present disclosure is to describe the method by which the unique markers on each bin can be used to spatially match the radiographic image of a bin (e.g., the identified bin that is holding a potentially forbidden item) to the physical bin holding that item.

The foregoing general description and the following detailed description thereof are merely exemplary aspects of the teachings of this disclosure, and are not restrictive.

Figure 1A:
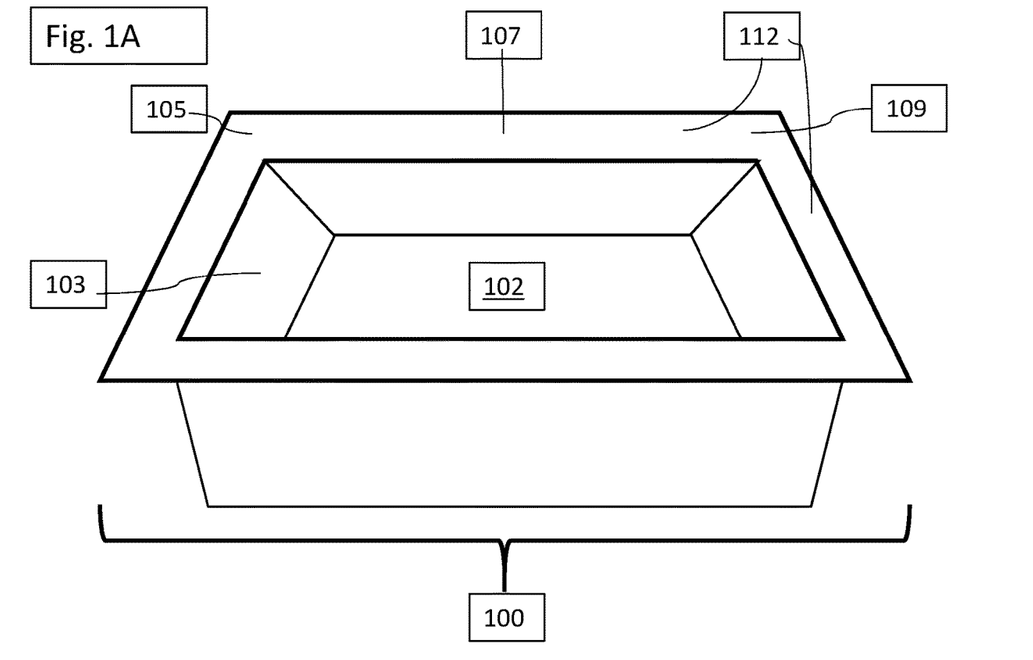
FIG. 1A is a perspective view of an unmarked bin commonly used at a security checkpoint, according to certain aspects of this disclosure.

FIG. 1A is a perspective view of an unmarked bin 100, which may be any kind of holding container or receptacle currently used for radiographic screening. Example receptacles can be based on Rubbermaid® Utility Boxes with the dimensions 20.0 Length×15.0 Width×5 Height (in inches). The unmarked bin 100 includes a receptacle surface 102 having a rectangular shape, sidewalls 103, and a lip 112 attached on at least one of the sidewalls 103 on either the width or length of the receptacle. The lip 112 includes a first corner 105, a second corner 109, and a middle point 107 located equidistant between the first corner 105 and the second corner 109.

Figure 1B:
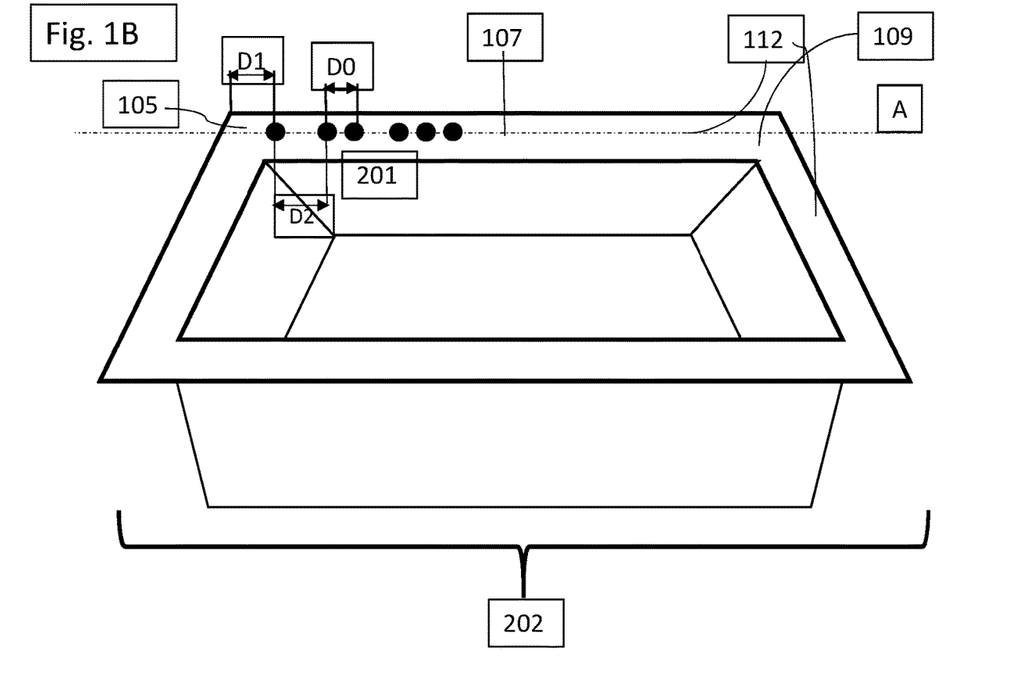
FIG. 1B is a perspective view of a marked bin with the combination of tag elements originating in the top-left corner, according to certain aspects of the disclosure.

FIG. 1B is a perspective view of the marked bin 202 with a marker 201, shown with a plurality of tag elements located on lip 112 along the A (length)-axis. The tag elements are placed along the A-axis of the bin, beginning a set distance D1 from the first corner 105 of the bin. In alternate examples, the distance D1 can also be represented by a length along the A axis from a side edge of the bin. No tag extends past the middle point 107 from the first corner 105. In this view, the tag elements are arranged in three groupings with a set distance D0 between the individual tag elements in each grouping, and a set distance D2, between the groups of tag elements, with D2 sufficiently wide enough to make the three groupings visually distinct and separate from each other. In an example, the distance D2 is approximately 1.5 or more times the distance D0.

Figure 1C:
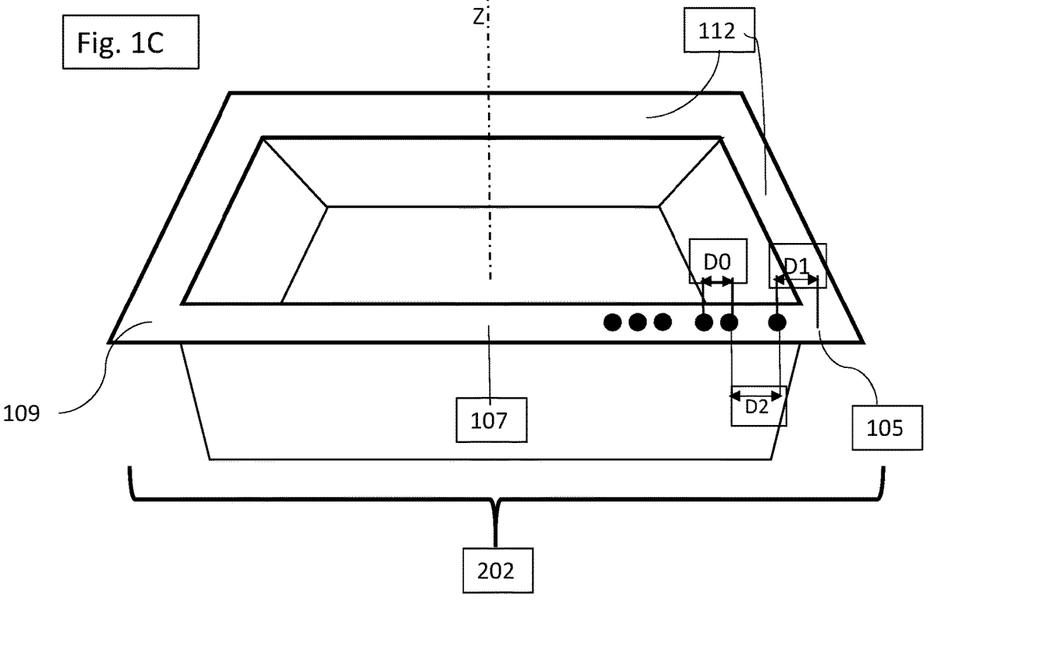
FIG. 1C is a perspective view of the marked bin shown in FIG. 1B, rotated 180 degrees about the z-axis, showing the retention of the tag element pattern, according to certain aspects of the disclosure.

FIG. 1C is a perspective view of the marked bin 202 seen in FIG. 1B and rotated 180 degrees about the z (vertical)-axis, such that the first corner 105, which was positioned in the upper-left corner in FIG. 1B, is now positioned in the lower-right corner. The sequence of the tag elements originating from the first corner 105 shown in FIG. 1B is retained after rotation, and the tag elements remain visually and physically associated distinctly with the first corner 105 (rather than the second corner 109), based on the tag element sequence not extending past the middle point 107.

Figure 1D:
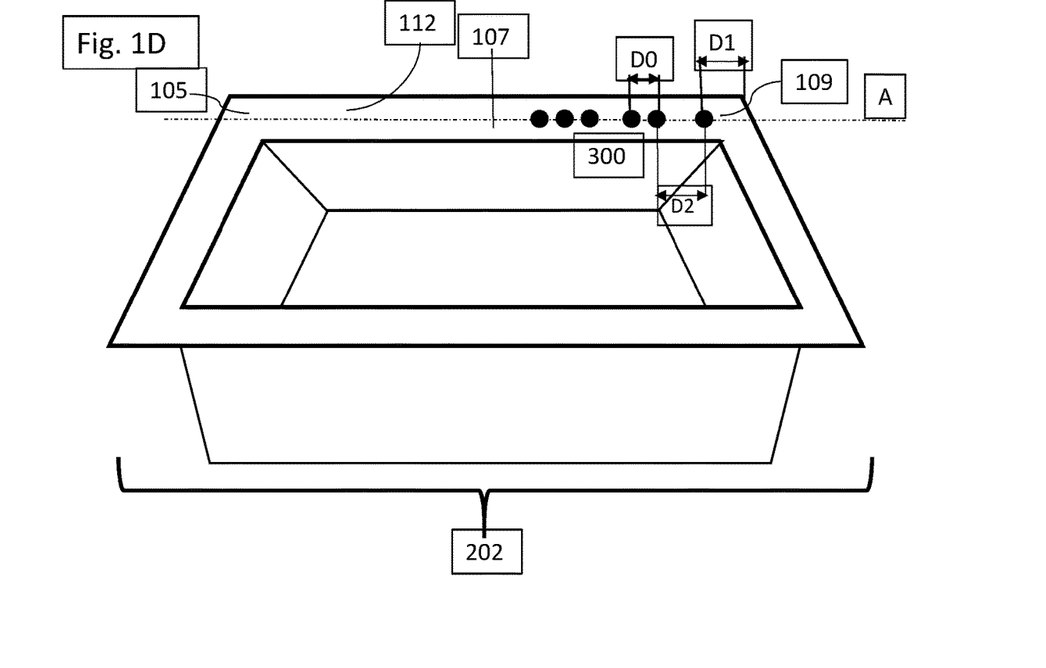
FIG. 1D is a perspective view of a bin marked with the same combination of tag elements seen in FIG. 1B, but with the combination of tag elements originating in the top-right corner and visually distinct from the bin seen in FIG. 1B and FIG. 1C, according to certain aspects of the disclosure.

FIG. 1D is a perspective view of a marked bin 202, with tag elements 300 located on lip 112 along the A (length)-axis. The tag elements are placed along the A-axis of the bin, beginning a set distance D1 from the second corner 109 of the bin. No tag extends past the middle point 107 from the first corner. Viewing the marker elements from left to right, the tag elements are in the same sequence as they appear from right to left on the bin in FIG. 1B. However, because the tags do not extend past the middle point 107 from the second corner 109, the FIG. 1D bin 202 is visually distinct from the FIG. 1B bin 202.

Figure 1E:
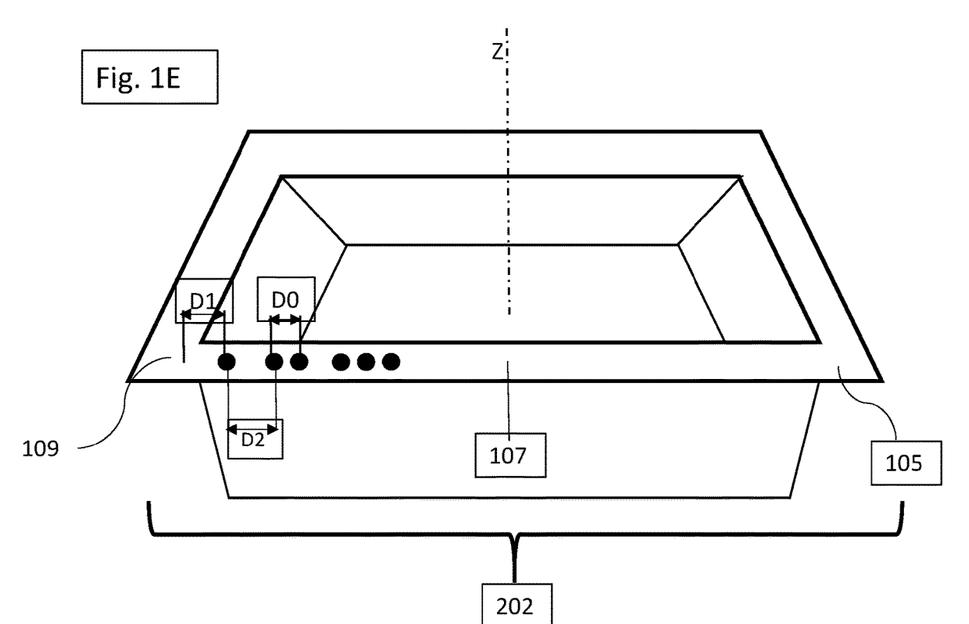
FIG. 1E is a perspective view of the marked bin shown in FIG. 1D, rotated 180 degrees about the z-axis, showing the retention of the tag element pattern seen in FIG. 1D and visually distinct from the marked bin in FIG. 1B and FIG. 1C, according to certain aspects of the disclosure.

FIG. 1E is a perspective view of the marked bin 202 seen in FIG. 1D and rotated 180 degrees about the z (vertical)-axis, such that the second corner 109, which was seen in the upper-right corner of FIG. 1D, is now in the lower-left corner. The sequence of the marker elements originating from the second corner 109 shown in FIG. 1D is retained after the rotation. As discussed with FIG. 1D, although the FIG. 1E bin has the same sequence of marker elements when viewed from left to right as the bin in FIG. 1C when viewed from right to left, the FIG. 1D/FIG. 1E bin is visually distinct from the bin in FIG. 1C because the tag elements originate from the second corner 109, and no marker elements extend past the middle point 107 of the bin.

Figure 2:
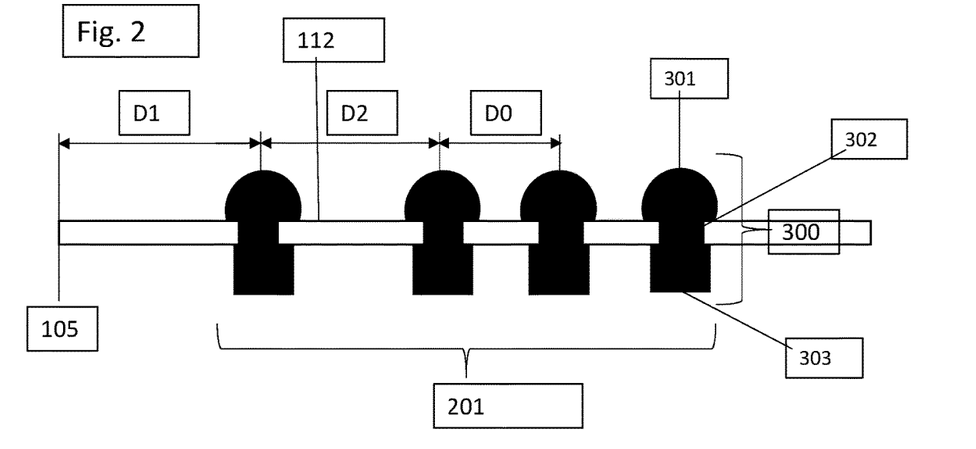
FIG. 2 is a cross-sectional view of a lip of the marked bin, according to certain aspects of the disclosure.

FIG. 2 is a cross-sectional view of the lip 112 and the marker 201 of the marked bin 202 viewed along the A-axis, according to certain aspects of the disclosure. The marker 201 may be permanently affixed through the lip 112 of the unmarked bin 100 in order to generate the marked bin 202. The marker 201 may include a plurality of tag elements 300 that are grouped and/or spaced and/or varied in number and location, thus forming a geometrical pattern. This geometrical pattern allows for identification of the marked bin 202 through radiographic screenings, visual inspections, and tactile inspections.

Each tag element 300 of the plurality of tag elements may include, in an exemplary embodiment, three parts: a body 302, a head 301, and a tail 303. Each tag element 300 can be fastened permanently to the lip 112 by inserting the tail 303 and the body 302 through the lip 112. The head 301 is shaped to rest on the lip 112, and the tail 303 is shaped in such a way that the tag element 300 clamps the lip 112 between the tail 303 and the head 301.

Each tag element 300 is made of a radiopaque material that is visible through radiographic screening and visual inspections, comprising a material such as steel, tungsten bismuth compounds, or thermoplastic compounds. A tag element should also be made from a material with a strong resistance to abrasion but also some degree of malleability in order for the tail 303 to be deformed.

Furthermore, the size of each tag element 300 should be sufficiently small to avoid damaging the lip 112 and to enable all tag elements to fit on half the width (x-axis) of the bin, e.g., to ensure the marker 201 does not cross the middle point 107 of the bin. The tag elements 300 should be sufficiently large to be seen through radiographic screenings and detectable by visual and tactile inspections. The head 301 of each tag element 300 may be flush with or protrude from the lip 112 to enable detection through touch.

According to certain aspects of the present disclosure, the marker 201 on the marked bin 202 will include at least three predetermined characteristics: (a) the number of groups of N tag elements, (b) the number of tag elements in each group, and (c) a location for the tag elements X on lip 112. A group can be identified based on which tag elements are positioned at a distance D0 from each other, while being separated from other groups by the distance D2. In the illustrated example, there are: (a) three groups, (b) with N=3 tag elements, and (c) two locations for the tag elements as shown. Accordingly, the illustrated example provides for 3×3×3×2=54 bin markings where all three groupings of all three tag elements and both bin locations are used, plus 3×2=6 bin markings where one grouping of three elements is used with both bin locations, plus 3×3×2=18 bin markings where two groupings of three elements are used with both bin locations, for 54+6+18=78 unique combinations. Additional combinations are possible when also including groupings where one or more tag elements and/or groupings are omitted (e.g., including the choice of zero tag elements and/or groupings, meaning combinations of 0, 1, 2, 3, not just 1, 2, 3).

The number of tag elements 300 may be an integer value between 1 and Nmax tag elements 300, where Nmax is determined based on the number of tag element groupings in a sequence, as well as the number of tag elements used in each group of this plurality of groups, in view of the spacings D1, D0, D2 and fitting the tag elements 300 within the distance from an edge of the bin 202 to the midpoint 107. In some example implementations, Nmax is a number chosen to be small enough to be easily counted through visual observation, yet large enough to provide a sufficient number of possibilities to uniquely identify each bin used at a security checkpoint.

In some examples, the number of groupings of tag elements (a grouping being formed by elements separated from each other by distance D0, while being separated from other groupings by D2) is limited, to accommodate the cognitive ability of the individual examining the bins. The number of groupings also can be limited by the length or width of the bin, as no individual tag element should extend past the middle point 107 from the corner where the tag element sequence originated. In one exemplary embodiment, the number of groups of tag elements is three, as illustrated in FIG. 1E by a first group including one tag element, a second group including two tag elements, and a third group including three tag elements. The groups are illustrated as having tag elements in increasing order from left to right, but in alternate examples, the groups can be arranged in different orders to create additional unique combinations of tag elements (e.g., a first group of two tag elements, a second group of one tag element, and a third group of three tag elements), even if the additional combinations have the same number of groups and/or tag elements.

In some example implementations, the number of tag elements also can be limited by an individual's ability to quickly count and remember the number of tag elements in each of the groupings. In an exemplary embodiment, the maximum number of tag elements in each group was limited to four and the maximum number of groups was limited to three, although other embodiments can use a higher number per group (e.g., eight or more) and a higher number of groups (e.g., six or more). With a maximum of four elements in a group, and a predetermined maximum of three groups in a sequence, the Nmax for such an example would be 12. An individual bin may have fewer than Nmax tag elements, by reducing the number of groupings of tag elements on a bin, or by reducing the number of tag elements in one or more of those groupings, to maximize the number of unique tag element sequences. Likewise, the number of tag elements in each grouping need not all be the same, and can differ between groups on the same bin, to further maximize the number of combinations that can be used to mark bins.

A location X for receiving the marker 201, a particular location on lip 112, may be chosen to be at the first corner 105 (as exemplified in FIGS. 1B and 1C), or the second corner 109 (as exemplified in FIGS. 1D and 1E). The offset-distance D1 is a distance on lip 112 that spans from the nearest corner location (e.g. first corner 105 in FIG. 1B, second corner 109 in FIG. 1D) to the marker 201. The offset-distance D1 is large enough to be easily noticeable on the electronic image generated by radiographic screenings, visual inspection, and tactile screening.

The location X should be selected such that the sequence of tag elements is retained and remains unique and distinct from sequences on other bins, even after rotation of the bin. In one embodiment, two possible locations for location X would be the top-left corner 105 of the lip 112, or the top-right corner 109 of the lip 112. When rotated 180 degrees along the vertical axis, the sequence of tag elements originating from the first corner 105 now appear on the bottom-right side of the bin. Similarly, when a bin containing tag elements originating from the second corner 109 is rotated 180 degrees along the vertical axis, the sequence of tag elements now appears on the bottom-left corner. Thus, tag elements may be seen in two possible configurations: either in the top-left or bottom-right corners, or the top-right and bottom-left corners. Because tag elements do not extend past the middle point 107 from the corner they originate, the two configurations remain visually distinct from one other, even upon rotation. Thus, each unique sequence of tag elements can be used twice, once in each configuration/location, to maximize the number of bins that can be marked with a visually distinct tag sequence.

Figure 3:
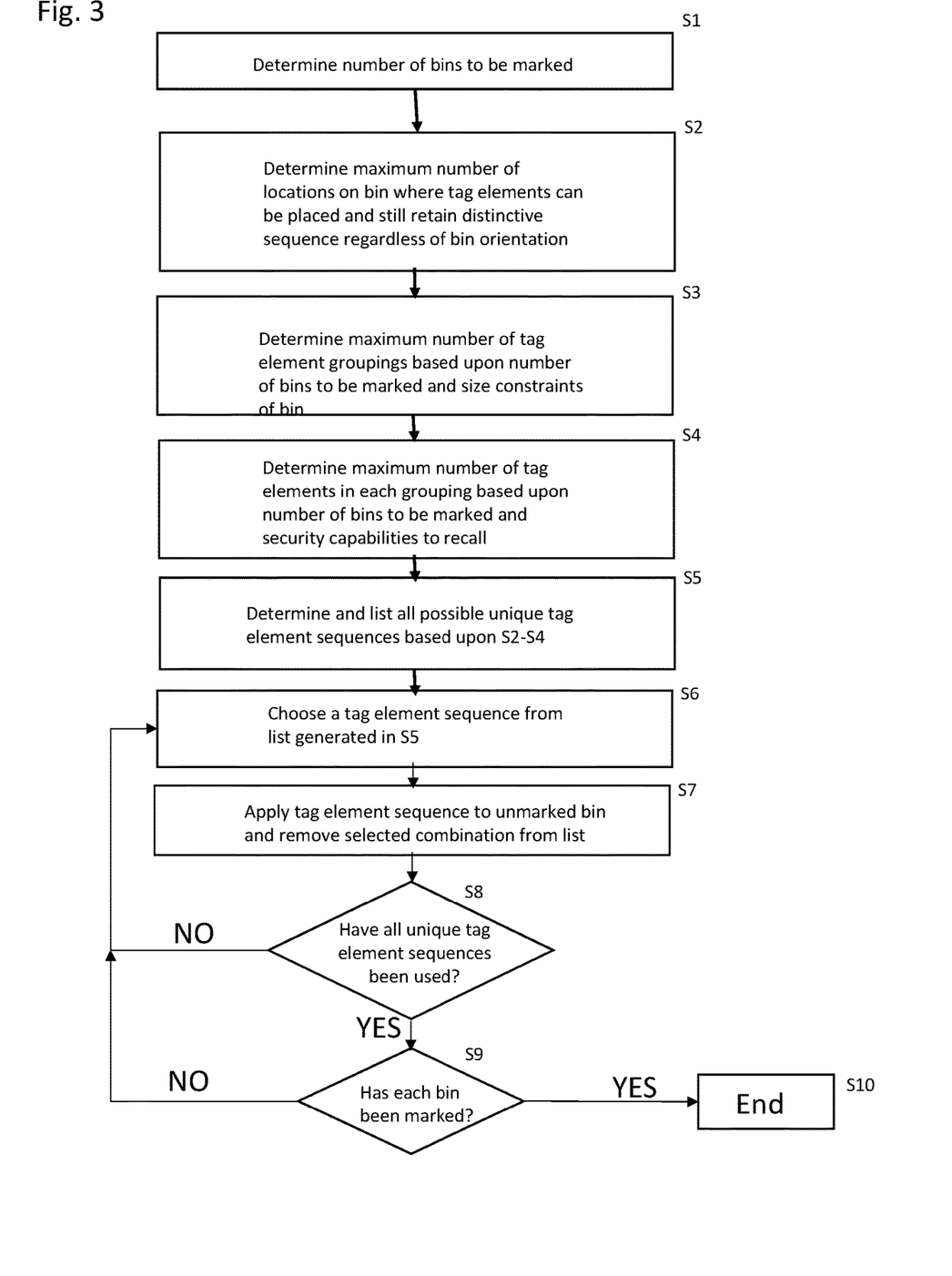
FIG. 3 is a flow diagram of an example process by which a plurality of marked bins is generated from a plurality of unmarked bins using a plurality of combinations of tag elements, according to certain aspects of the disclosure.

A method according to certain aspects of the present disclosure for generating a plurality of marked bins 202 from a plurality of unmarked bins 100 is as follows and is depicted in FIG. 3. This process is based on varying at least one of the three predetermined characteristics of the marker 201 (i.e., the number of groups of tag elements, the number of tag elements in each of the groups, and the location X of the tag elements) in order to compose unique markers 201. These markers 201 may then be created and affixed to lip 112 of the unmarked bin 100 along the A-axis.

First, the number of unmarked bins 100 to be marked is determined in S1. This number can be chosen as a function of the number of the unmarked bins 100 that are actively used at a given time at a security checkpoint. In other instances, the number of unmarked bins may be limited by the number of unique combinations of tag sequences that can be generated in further steps.

Next, the maximum number of tag locations on the bin lip are determined in S2. These locations must be selected to ensure that the sequence of tag elements remains unique and distinctive regardless of rotation of the bin Next, the maximum number of tag element groups, and the maximum number of tag elements in each group, are determined in S3 and S4. These values can be selected based on security personnel's capability to quickly count, remember, and identify the overall sequence of tag elements. These two numbers comprise the Nmax. No bin should have more tag elements than the value of Nmax.

Next, at S5, determine and list all possible sequences of unique tag element sequences and each location where these tag element sequences can be placed based upon S2, S3, and S4. Bins may have fewer than the maximum number of groupings of tag element and fewer than the maximum number of tag elements in each group. Additionally, all of the groupings in a single sequence need not have the same number of tag elements.

In step S6, a tag element sequence is chosen from the list generated in S5. In step S7, one of the plurality of unmarked bins 100 is selected for marking, and one of the sequences of markings selected from the list generated in S5 is chosen and applied to the unmarked bin. The sequence is thereafter removed from the list of available combinations.

In step S8, the system checks whether all unique tag element sequences have been used. If not, steps S6 and S7 are repeated with a new bin and a new sequence from the list generated in step S5. This process is repeated until all of the possible sequences on the list have been utilized or all of the bins have been marked.

Once all unique tag element sequences are used, flow proceeds to step S9, where the system checks whether each bin has been marked. If not, flow proceeds to step S6. Once each bin has been marked, the process ends at step S10.

Figure 4:
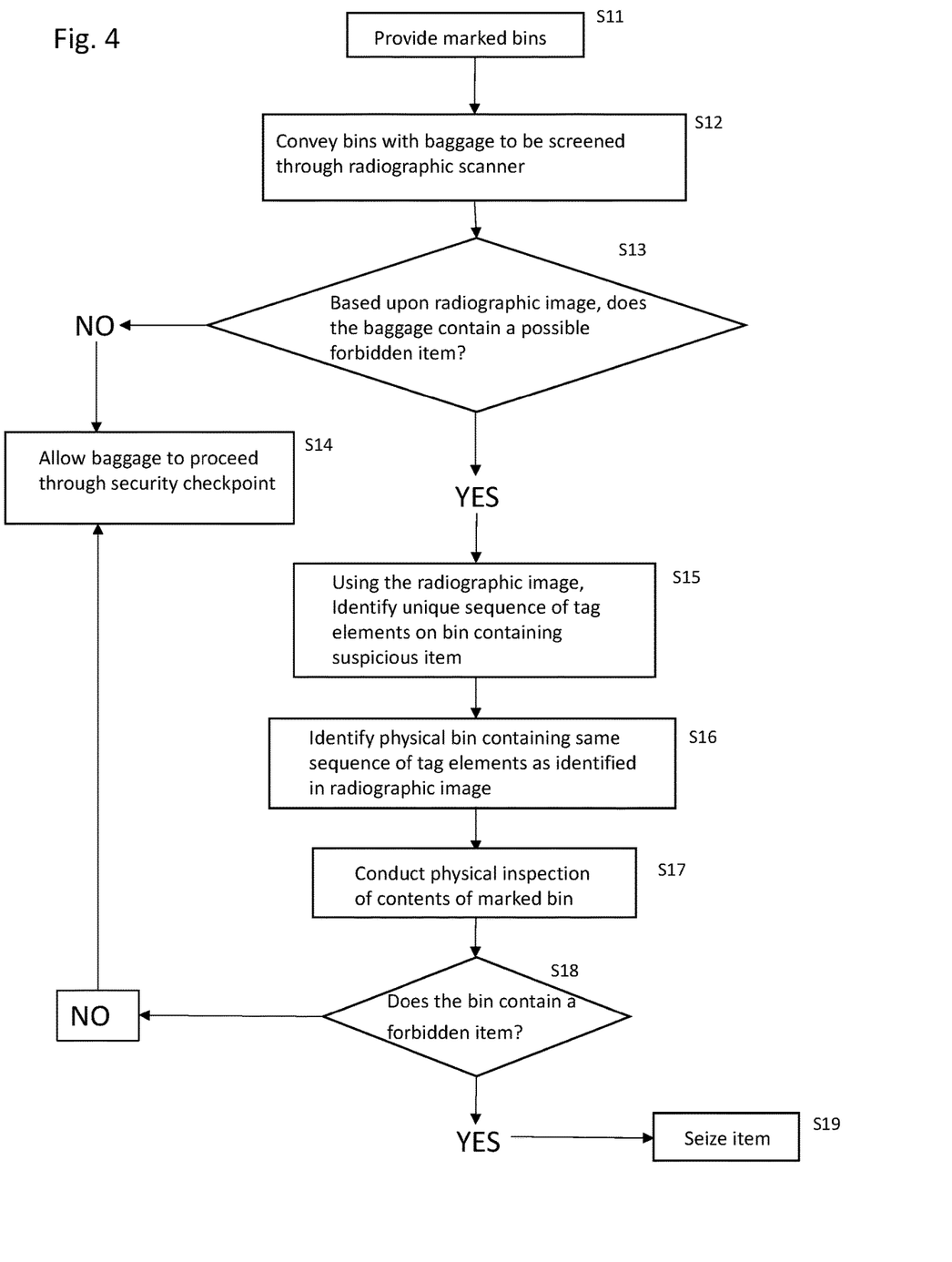
FIG. 4 is a flow diagram of an example process by which a possible forbidden item inside the plurality of marked bins is identified and seized, according to certain aspects of the disclosure.

FIG. 4 depicts a method according to certain aspects of the present disclosure for identifying and seizing a container holding a possible forbidden item. The process is based on comparing the sequence of tag elements in the radiographically image of the divestiture bin holding the container with the sequence of tag elements on the physical bin.

At S11, a number of marked bins 202 prepared according to certain aspects of the present disclosure should be provided at a security checkpoint containing a radiographic scanner. These bins should all have unique sequences of tag elements, with no two bins containing the same sequence of tag elements in the same location.

Containers such as carry-on luggage, laptop bags, or other containers commonly seen at security checkpoints, such as in airports, should be placed in the marked bins 202. At step S12, these bins should be conveyed through the radiographic scanner and the radiographic images generated by the scanner should be inspected by security personnel. At step S13, if the system determines that the containers in the image do not appear to contain a forbidden item, flow proceeds to step S14 and there is no visual inspection or seizure of the container.

If at S13 it is determined that the radiographic image shows a possible forbidden item in the container, the image produced by the radiographic scanner is conveyed to the security workers responsible for visual inspection. Those individuals examine the divestiture container in the picture for the sequence of tag elements 300 on the lip 112 of marked bin 202. The tag elements will likely appear in the image as opaque or solid dark blue circles. At step S15, the system can identify the tag element sequence. For example, after locating the sequence of tag elements, security workers can determine the sequence of tag elements and which quadrant of the bin the tag elements appear (e.g., according to certain aspects of the present disclosure, the tag elements will appear either in the top-left/bottom-right or top-right/bottom-left quadrants when the bin is examined with the longer walls on the top/bottom and the shorter walls on the sides).

Next, as shown in step S16, security workers can examine the physical bins that have just gone through the radiographic scanner. Security identifies the bin containing the same sequence of tag elements in the same location as they appear in the image from the radiographic scanner.

At step S17, the contents of the container in the identified bin are examined. If at step S18 it is determined that the bin contains a forbidden item, the contents are seized per step S19. If no forbidden items are found at step S18, flow proceeds to step S14 and the baggage is allowed to proceed through the security checkpoint.

The location and distance between the tag elements 300 according to certain aspects of the present disclosure can also be used to more quickly and accurately determine the approximate size and location of the possible forbidden item within the container. The location of the tag elements on the lip in relation to the relative location of the possible forbidden item within the container can be used to determine what quadrant of the marked bin the item is contained. Furthermore, the set distance D1 between the corners of the lip 112 and the first tag element, which should be known to security personnel can be used to estimate the size of the possible forbidden item.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosures of the present invention are intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A bin for use in security checkpoints, comprising:
a receptacle surface with sidewalls, one of the sidewalls being on one side of the bin and extending a bin length, along a length axis of the bin;
a lip, provided on the sidewall on one side of the bin, the lip including a first corner, a second corner, and a middle point between the first corner and the second corner, the first corner being spaced the bin length from the second corner; and
a geometrical marker, the geometrical marker being radiographically, visually, and tactilely detectable on the lip, wherein the geometrical marker includes:
a plurality of tag elements fastened to the lip, at an offset-distance from a corner of the lip, the corner of the lip being among the first corner and the second corner, the plurality of tag elements forming a distinct geometric pattern, the distinct geometric pattern comprising a plurality of groups of the tag elements and, for each group, the tag elements in the group being aligned with equidistant spacing from one other and being among the plurality of tag elements, and
no tag element among the plurality of tag elements being located further than half of the bin length from said corner.

2. The bin of claim 1, wherein the offset distance between the corner of the lip and the tag elements is larger than the equidistant spacing between the plurality of tag elements in each group of tag elements.

3. The bin of claim 2, wherein:
the equidistant spacing is an inter-tag element distance,
the plurality of groups are equidistantly separated from one another by an inter-group distance, the inter-group distance being at least approximately 1.5 times the inter-tag element distance, to enable visual determination of the groups as being distinct groups of tag elements, and
for each group among the plurality of groups, the inter-tag element distance equidistantly separates the tag elements within the group.

4. A bin for use in security checkpoints, comprising:
a receptacle surface with sidewalls, one of the sidewalls being on one side of the bin and extending a bin length, along a length axis of the bin;
a lip, provided on the sidewall on one side of the bin;
a geometrical marker, the geometrical marker being radiographically, visually, and tactilely detectable on the lip, the geometrical marker including a plurality of tag elements fastened to the lip, in an arrangement forming a distinct geometric pattern, wherein each tag element comprises a head resting on the lip, a body inserted through the lip, and a tail.

5. The bin of claim 4, wherein the head has a texture that tactilely contrasts with a texture of the lip.

6. The bin of claim 3, wherein the offset distance and locations of the tag elements are set to enable estimation of a size and location of an item contained in the bin.

7. A bin for use in security checkpoints, comprising:
a receptacle surface with sidewalls, one of the sidewalls being on one side of the bin and extending a bin length, along a length axis of the bin;
a lip, provided on the sidewall on one side of the bin;
a geometrical marker, the geometrical marker being radiographically, visually, and tactilely detectable on the lip, the geometrical marker including a plurality of tag elements fastened to the lip, in an arrangement forming a distinct geometric pattern, wherein the tag elements are formed by pop rivets.

8. A method for marking a plurality of bins for use in a security checkpoint, each bin of the plurality of bins having a receptacle surface, sidewalls, and lip provided on the sidewalls, the method comprising:
determining a maximum number of distinct geometrical patterns of tag elements based upon a maximum number of groupings of tag elements and a maximum number of individual tag elements within each of the plurality of groupings;
determining each possible distinct geometrical pattern of tag elements;
determining a location X on a lip of the bins to offset the first tag element in the geometrical pattern that allows the geometric pattern to remain distinct from other patterns even when the bin is rotated;
marking the lip of each bin by aligning the tag elements according to one of the distinct geometrical patterns of tag elements according to a predetermined inter-tag element spacing distance provided between the tag elements, and placing the first tag element with an off-set distance from the location X; and the marking being configured to use each distinct geometrical pattern on no more than one bin of the plurality of bins.

9. The method of claim 8, where the plurality of bins is marked with a secondary identifier, the secondary identifier including a color marking.

* * * * *